(12) United States Patent
Poulsen et al.

(10) Patent No.: US 6,323,903 B1
(45) Date of Patent: Nov. 27, 2001

(54) THREE AXIS CAMERA MOUNT

(75) Inventors: Andrew S. Poulsen, Fort Collins; Russell S. Krajec, Berthoud, both of CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/026,300

(22) Filed: Feb. 19, 1998

(51) Int. Cl.⁷ .................................................. H04N 5/225
(52) U.S. Cl. ........................................... 348/373; 348/375
(58) Field of Search ..................................... 348/373, 374, 348/375, 340; 396/419, 420, 421, 428; 248/187.1, 177.1, 178.1, 183.1, 660; 355/18

(56) References Cited

U.S. PATENT DOCUMENTS

| | | | |
|---|---|---|---|
| 5,027,141 | * 6/1991 | Bowers | 396/419 |
| 5,247,330 | * 9/1993 | Ohyama et al. | 348/373 |
| 5,303,035 | 4/1994 | Luecke et al. | 356/399 |
| 5,585,849 | * 12/1996 | Robalino | 348/373 |
| 5,734,417 | * 3/1998 | Yamamoto et al. | 348/373 |
| 5,883,697 | * 3/1999 | Ohyama | 355/18 |
| 5,954,310 | * 9/1999 | Soldo et al. | 248/660 |
| 6,115,068 | * 9/2000 | Ariga et al. | 348/373 |

* cited by examiner

*Primary Examiner*—Wendy Garber
*Assistant Examiner*—Luong Nguyen

(57) ABSTRACT

A mount for directional devices such as cameras, optical devices or laser devices, providing independent orthogonal adjustment of panning alignment of such devices in a horizontal plane in combination with independent adjustment of rotation alignment of such devices about a vertical axis parallel to the optical axis. In a preferred embodiment, a CCD camera is aligned over a Liquid Crystal Display under test. Threaded adjustment screws angularly separate opposing plates disposed along each of x-, y- and z-axes. This angular separation generates a moment about the axis of rotation, causing a corresponding shift in the camera's alignment. Structure is also provided to compensate for differential thermal behavior of opposing plates. The inventive mount is advantageously designed to be reversible so that left-handed and right-handed embodiments can be nested to facilitate a multi-camera deployment.

43 Claims, 2 Drawing Sheets

THREE AXIS CAMERA MOUNT

TECHNICAL FIELD OF THE INVENTION

This invention relates generally to mounts for directional devices such as cameras, optical devices or laser devices, and specifically to a mount that provides independent orthogonal adjustment of panning alignment of such devices in a horizontal plane in combination with independent adjustment of rotation alignment of such devices about a vertical axis parallel to the optical axis.

BACKGROUND OF THE INVENTION

It is known in the art to use cameras having charge-coupled device ("CCD") arrays to test the operation of liquid crystal displays ("LCDs") such as may be found on many cellular telephones. As information is fed from the telephone to be displayed on the LCD, testing generally requires that the LCD actually displays the information in the way designed. A technique to enable such testing is to view the LCD with a CCD camera as the information is sent to the LCD. The signal from the camera can be compared with the information sent to the LCD to verify accuracy to a high degree of resolution.

It will be understood that it is important for the CCD array in the camera to be able to be accurately aligned with the LCD array to enable precise testing. If the scan lines on the camera can be lined up accurately with the pixels on the LCD, the testing software generally works much more predictably. Camera mountings in the art generally allow fine adjustment of the camera's field of view by "sweeping" or "panning" along both X and Y directions in the plane of the arrays, but do not allow fine adjustment of rotation about a Z-axis orthogonal to the plane of the arrays and parallel to the optical axis of the camera. Hereinafter, such rotational adjustment about the Z-axis shall also be referred to "Theta" adjustment, or adjustment in the "Theta axis".

Prior art mounting devices are known to use translational stages to adjust position in X and Y directions. These stages consume significant space. Such prior art mounts also offer no Theta axis adjustment as a built-in feature, so that X, Y and Theta adjustment can be accomplished independently in a single device.

In addition to being large, prior art mounts tend to be very expensive. The large size and prohibitive expense of prior art mounts can be explained to some extent in that such mounts are almost universally designed for optical applications. There is a need in the art for a camera mount addressing the problems of digital testing in a confined space. In particular, it is sometimes desirable to place two or more CCD cameras in close proximity to test LCDs. The extravagant use of physical space by prior art mounts makes such multi-camera deployments very challenging.

Prior art mounts typically also lack locking mechanisms for holding the camera in place during and after adjustment and alignment. It is often desirable to move the entire testing assembly without upsetting the alignment.

There is therefore a need in the art for a camera mount independently adjustable in X, Y and Theta axes. A solution also providing compactness and cost economy will also provide measurable advantage, especially if multi-camera deployments are also enabled. A locking mechanism will provide further advantage towards preventing loss of alignment.

SUMMARY OF THE INVENTION

These and other objects, features and technical advantages are achieved by a three axis camera mount that provides rotational adjustment in X, Y, and Theta axes. All axes of rotation consist of two plates rotationally attached using spherical contact surfaces and adjusted by a fine pitch screw. X and Y rotation is required to pan the camera to align its field of view precisely. The Theta rotation is to compensate for the camera's inherent misalignment in the CCD position, which is often out of position by up to 3 degrees.

Each adjustable axis consists of two plates, a ball bearing and another spherical surface for the hinge, one or more spring-loaded retaining screws, and a fine pitch adjustment screw with a lock nut.

The invention has a locking capability. Using lock nuts on the adjustment screws means that there will not be any movement of the device during use or drifting over time.

The invention combines the three needed axes of adjustment in one device. The design further controls differential thermal behavior of the cooperating elements of the mount so as to minimize the effect of such thermal behavior on the alignment. In a preferred embodiment, thermal behavior is controlled by guiding differential thermal displacement via slots retaining one point of contact in each of the horizontal and vertical planes. Displacement is contained to axial directions (X, Y or Z) that are easily compensated for by adjustment.

The invention is very low cost. Ball bearings are used for the precise rotation axes. Machined features in the various plates serve as the other bearing surfaces.

Each camera is attached to a 3-axis mount that allows the maintenance technician to adjust the camera's field of view along X and Y axes independently. The mount further allows the operator to align the Theta axis independent of other adjustments.

In a preferred embodiment, the angular range of camera motion for each adjustment is approximately plus or minus 5 degrees. The threads on the adjustment screws are selected to give an approximate resolution of 0.358 degrees of camera rotation per turn of the screw. This corresponds to a panning motion for the camera's field of view of 1.5 mm to 2.5 mm per turn of the screw (depending on the distance of the mount from LCD).

The camera is connected to the mount using a camera-specific mounting plate. This enables the mount to be used with different cameras.

Each mount contains a baseplate rigidly mounted to the fixture. The horizontal motion plate (providing X and Y adjustments) is attached to the baseplate. The vertical support plate is fixed to the horizontal motion plate. The vertical motion plate (providing Theta adjustment) is attached to the vertical support plate. The camera-specific mounting plate is fixed to the vertical motion plate, and the camera is mounted to it.

The mount is also designed to accommodate multi-camera deployment with minimal adaptation. In a preferred embodiment, the L-shaped base plate is reversible. The mount may be assembled on the base plate whether the base plate is disposed "right side up" or "upside down," thus allowing two cameras to be placed side by side in within a "U" configuration formed by adjacent L-shaped base plates. This feature makes the invention extremely compact. Its nested design conserves space to the highest degree possible, while still allowing very fine, precision adjustment.

Reversibility of the base plate is enhanced still further in a preferred embodiment where the design is selected to keep the optical axis of the camera a constant distance from the vertical mounting surface regardless of whether the base plate is disposed "right side up" or "upside down." In this way, cameras can be nested in a multi-camera deployment where the optical axes of the cameras are co-planar and parallel to the plane of the vertical mounting surface.

It is therefore a technical advantage of the present invention to provide a camera mount that is independently adjustable in X, Y and Theta axes.

A further technical advantage of the present invention is to contain thermal displacement of the mount to directions that are easily adjustable.

A still further technical advantage of the present invention is to be able to lock in an adjustment of the mount to preserve alignment.

Another technical advantage of the present invention is to provide a light and compact mount that is relatively low in cost to manufacture.

Another technical advantage of the present invention is to facilitate camera nesting in multi-camera deployments. A reversible base plate allows the same mount to be assembled on the base plate whether the base plate is disposed "right side up" or "upside down." As a result, two cameras may be nested side-by-side in a within a combined "U" frame, advantageously also maintaining a constant separation between the optical axes of the camera and the plane of the vertical mounting surface.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
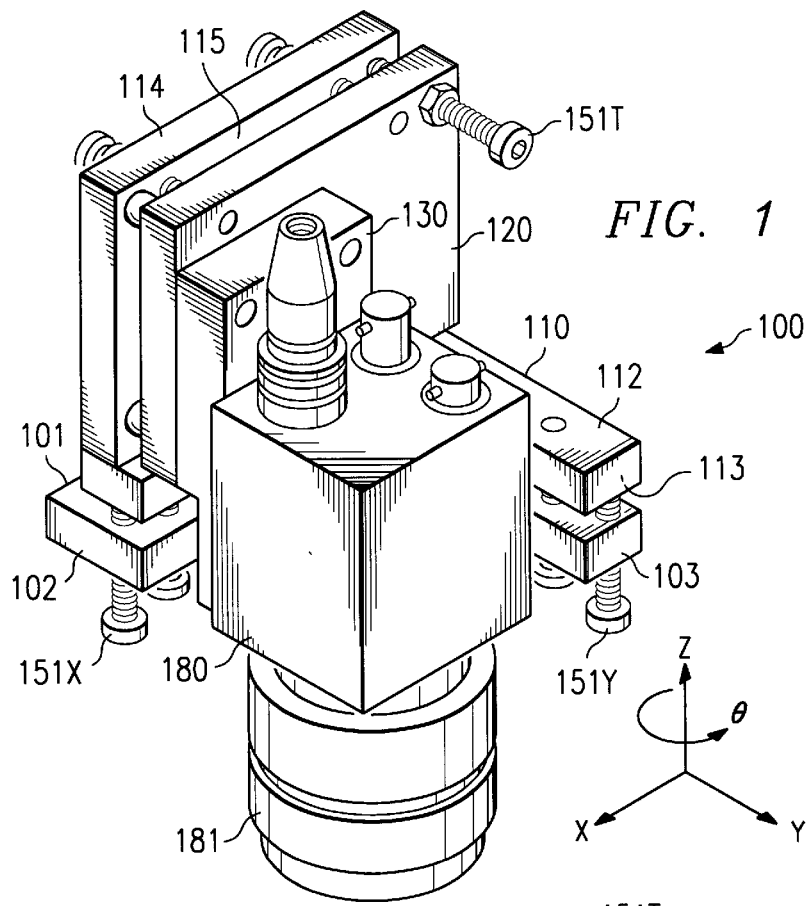
FIG. 1 is a frontal perspective view of inventive mount 100 holding a camera pointing down.

FIG. 1 is a perspective view of the inventive mount 100 holding camera assembly 180 in preparation for alignment. In FIG. 1, camera assembly 180 comprises lens 181 (pointing down) awaiting alignment over, for example, an LCD (not illustrated). It will be appreciated that in accordance with the invention, it is desired to adjust the field of view of lens 181 by independently (1) sweeping (panning) along an X-axis orthogonal to the optical axis of lens 181, (2) sweeping (panning) along a Y-axis also orthogonal to the optical axis of lens 181 and further orthogonal to the X-axis, and (3) rotating about a Z-axis parallel to the optical axis of lens 181. As noted earlier, for purposes of this disclosure, rotation of about the Z-axis is termed "Theta rotation" or "Theta adjustment."

In FIG. 1, base plate 101 is disposed to be fixed to an immobile vertical mounting surface (fixation to surface not illustrated for clarity). As shown on FIG. 1, base plate 101 is advantageously an L shape with legs extending along X- and Y-axes. In the X- and Y-axis convention according to FIG. 1, mounting leg 102 of base plate 101 extends along the X-axis and is fixed to the vertical mounting surface so that cantilevering leg 103 cantilevers out from the vertical mounting surface. Thrust plate 110 comprises an L-shaped horizontal motion portion 112 with a horizontal planar surface 113 also disposed in the X-Y plane and positioned to oppose base plate 101. Thrust plate 110 further comprises a vertical support portion 114 with a vertical planar surface 115 disposed to extend along the Z-axis.

With further reference to FIG. 1, vertical motion plate 120 is planar, its plane extending along the Z-axis and its reverse face positioned to oppose vertical planar surface 115. Mounting plate 130 attaches to the averse side of vertical motion plate 120, and camera assembly 180 in turn attaches to mounting plate 130. In a preferred embodiment, inventive mount 100 may be disposed to accommodate a range of mounting plates 130, each mounting plate 130 customized to the particular attachment requirements of various different types and models of camera assembly 180.

Figure 2:
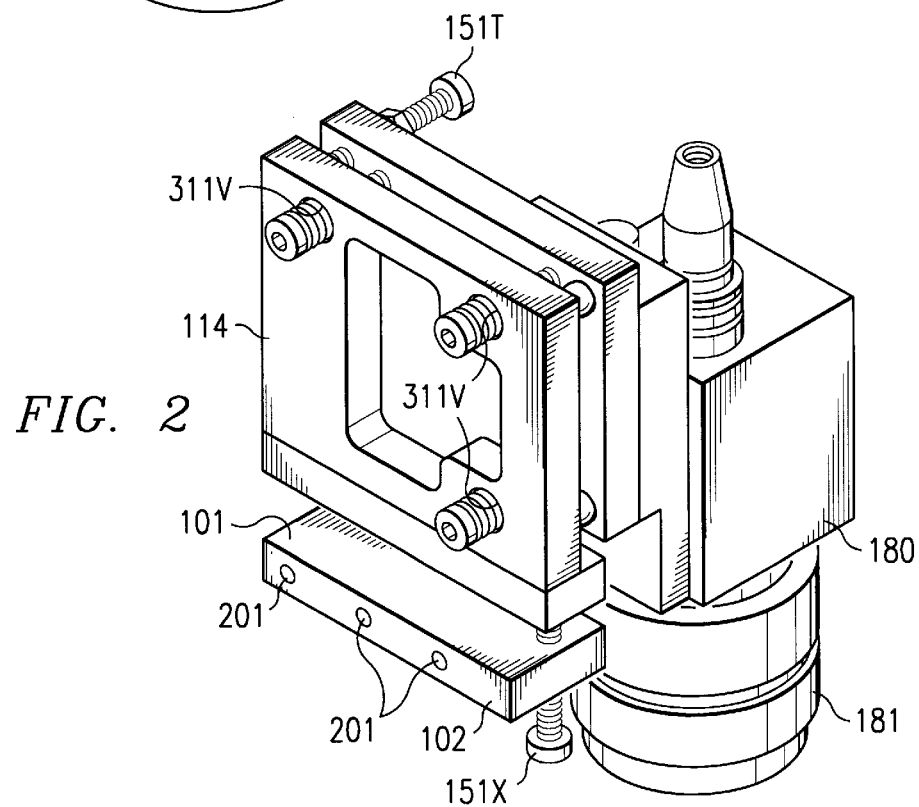
FIG. 2 is a rear perspective view of inventive mount 100 as depicted in FIG. 1.

FIG. 2 is a further perspective view of inventive mount 100, this time from behind vertical support portion 114. FIG. 2 shows holes 201 in mounting leg 102 of base plate 101. Holes 201 receive fasteners (not illustrated) to fix inventive mount 100 to a vertical mounting surface (omitted for clarity) in the manner described above with reference to FIG. 1.

Figure 3:
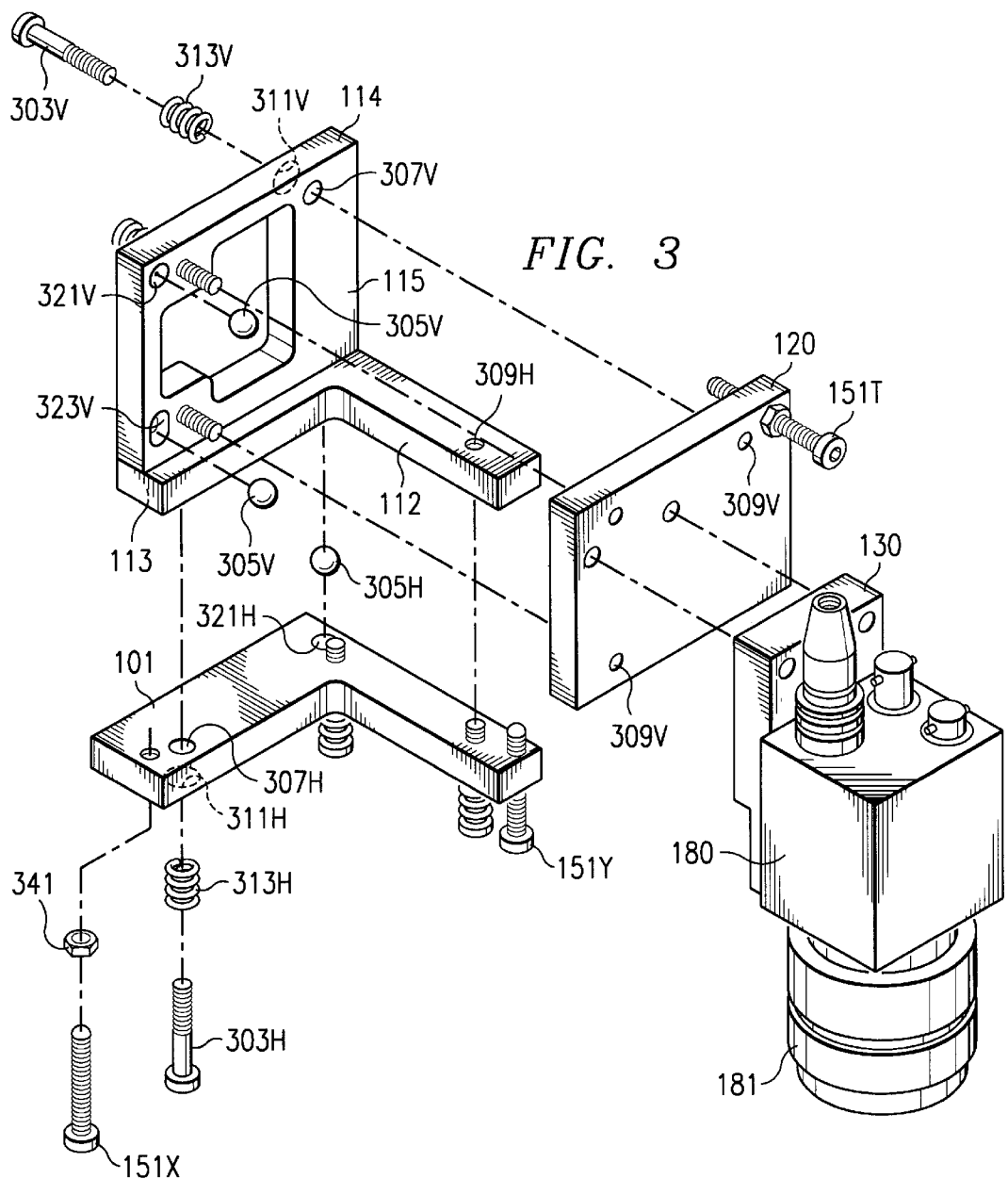
FIG. 3 is an exploded view of inventive mount 100 as depicted in FIG. 1.

FIG. 3 is an exploded view of FIG. 1. With reference now to FIG. 3, base plate 101 and horizontal motion portion 112 are held together by screws 303H and are separated by ball bearing 305H. Screws 303H pass through plain holes 307H in base plate 101 and engage into threaded holes 309H in horizontal motion portion 112. Recesses 311H in the underside of base plate 101 receive springs 313H as retained over screws 303H threaded into threaded holes 309H. When compressed by tightening of screws 303H, springs 313H thus hold base plate 101 and horizontal motion portion 112 adjustably apart on opposing sides of ball bearing 305H.

FIG. 3 further shows that vertical support portion 114 and vertical motion plate 120 are held together by screws 303V and separated by ball bearings 305V. Analogous to the separation of base plate 101 and horizontal motion portion 112, screws 303V pass through plain holes 307V in vertical support portion 114 and engage into threaded holes 309V in vertical motion plate 120. Recesses 311V in the back of vertical support portion 114 receive springs 313V as retained over screws 303V threaded into threaded holes 309V. When compressed by tightening of screws 303V, springs 313V thus hold vertical support portion 114 and vertical motion plate 120 adjustably apart on opposing sides of ball bearings 305V.

With continuing reference to FIG. 3, ball bearing 305H sits, when assembled, in a recess 321H in each of opposing faces of base plate 101 and horizontal motion portion 112 (recess 321H in horizontal planar surface 113 hidden). Recesses 321H may advantageously, although not mandatorily, be undersized holes in said opposing faces.

Similarly, one of ball bearings 305V sits, when assembled, in a recess 321V in each of opposing faces of vertical support portion 114 and vertical motion plate 120 (recess 321V in vertical planar surface 115 again hidden). Again, recesses 321V may advantageously, although not mandatorily, be undersized holes in said opposing faces. In a preferred embodiment, however, one side of the other ball bearing 305V sits, when assembled, in a slotted recess 323V in one of the opposing faces of vertical support portion 114 and vertical motion plate 120 (FIG. 3 illustrating slotted recess 323V in vertical support portion), while the other side of the other ball bearing 305V sits in a plain recess 321V (hidden in FIG. 3). Again, slotted recess 323V may advantageously, although not mandatorily, be an undersized slotted hole. The inventive significance of this slotted recess 323V feature is described further below in connection with the control of thermal behavior.

FIG. 3 also depicts adjustment screws 151X, 151Y and 151T. Adjustment screws 151X and 151Y are disposed, when threaded through threaded holes 331H in base plate 101, to adjustably separate base plate 101 and horizontal motion portion 112 at the point of contact of adjustment screws 151X and 151Y with horizontal planar surface 113. In this way, referring now to FIG. 1, it will be seen that the adjustable separation caused by rotation of adjustment screw 151X causes a moment to be exerted about the Y-axis along a line between ball bearing 305H and the point of contact between adjustment screw 151Y and horizontal planar surface 113. This moment causes camera assembly 180 to sweep or pan along the X-axis. Similarly, the adjustable separation caused by rotation of adjustment screw 151Y causes a moment to be exerted about the X-axis along a line between ball bearing 305H and the point of contact between adjustment screw 151X and horizontal planar surface 113. This moment causes camera assembly 180 to sweep or pan along the Y-axis.

Referring back to FIG. 3, adjustment screw 151T is disposed, when threaded through threaded hole 331V in vertical motion plate 120, to adjustably separate vertical support portion 114 and vertical motion plate 120 at the point of contact between adjustment screw 151T and vertical planar surface 115. In this way, referring now again to FIG. 1, it will be seen that the adjustable separation caused by rotation of adjustment screw 151T causes a moment to be exerted about the Z-axis along a line between ball bearings 305V. This moment causes the desired Theta adjustment of camera assembly 180.

The foregoing X, Y and Theta adjustment is further facilitated in a preferred embodiment where, advantageously, plain holes 307H and 307V are oversized in receiving screws 303H and 303V respectively. A loose fit of screws 303H and 307V in holes 307H and 307V enables "sloppiness" therein, whereby the retention of screws 303H and 303V in holes 307H and 307V does not impede or interfere with enablement of X-, Y- or Theta adjustment of camera assembly 180.

With continuing reference to FIG. 3, adjustment screws 151X, 151Y and 151T each also optionally include locking nuts 341 to lock adjustment screws 151X, 151Y and 151T in place once alignment is complete.

In a preferred embodiment, adjustment screws 151X, 151Y and 151T are advantageously ball-tipped M5×0.4 screws. This thread pitch gives an approximate resolution of 0.358 degrees of camera rotation per turn of the screw, which in turn corresponds to a panning motion for the camera's field of view of 1.5 mm to 2.5 mm per turn of the screw (depending on the distance of the mount from LCD). The ball-tipped feature of adjustment screws 151X, 151Y and 151T ensures that highly localized points of contact are made with opposing surfaces during adjustment, allowing incremental displacement to be exerted on the opposing surfaces as precisely as possible.

As described above with reference to FIG. 3, a preferred embodiment disposes one ball bearing 305V to sit, when assembled, in a slotted recess 323V in one of the opposing faces of vertical support portion 114 and vertical motion plate 120. In this embodiment, the three points of contact in the interface between vertical support portion 114 and vertical motion plate 120 comprise one fixed (one ball bearing 305V sitting in recesses 321V), one free (ball-tip of adjustment screw 151T on vertical planar surface 115), and one guided (other ball bearing 305V constrained by one side thereof received into slotted recess 323V). With the three points of contact disposed in this way (one fixed, one free, one guided), differential thermal behavior of vertical support portion 114 and vertical motion plate 120 is now controlled to displacement in either Z- or X-directions, both of which can be directly compensated for by adjustment.

Thermal behavior in the horizontal (X-Y) plane is similarly controlled by an analogous mechanism. Ball bearing 305H as received in recesses 321H is a fixed point of contact in the interface between opposing faces of base plate 101 and horizontal motion portion 112. The ball-tip of a selected one of adjustment screws 151X or 151Y is a free point of contact against horizontal planar surface 113. In a preferred embodiment, however, the ball-tip of the other adjustment screw is received into a slot provided into horizontal planar surface 113 along an axis parallel to the portion of base plate 101 directly opposing beneath (slot not illustrated). Again, with the three points of contact disposed in this way (one fixed, one free, one guided), differential thermal behavior of base plate 101 and horizontal motion portion 112 is now controlled to displacement in either X or Y- directions, both of which can be directly compensated for by adjustment.

Further reference to FIG. 3 shows that in a preferred embodiment, base plate 101 is disposed to be reversible. Base plate 101 may be separated from the rest of the assembly by releasing screws 303H, whereupon base plate 101 may be flipped "upside down" so that what was formerly the underside of base plate 101 now opposes horizontal planar surface 113. It will be appreciated that to enable this reversibility, adjustment screws 151X and 151Y must be unscrewed all the way out and screwed in again from the other side. Also, to be reversible, base plate 101 must (1) provide recesses 311H and a recess 321H on both sides, in order to receive springs 313H and ball bearing 305H from either side; and (2) provide holes 307H equidistantly along mounting leg 102 and cantilevering leg 103.

Figure 4:
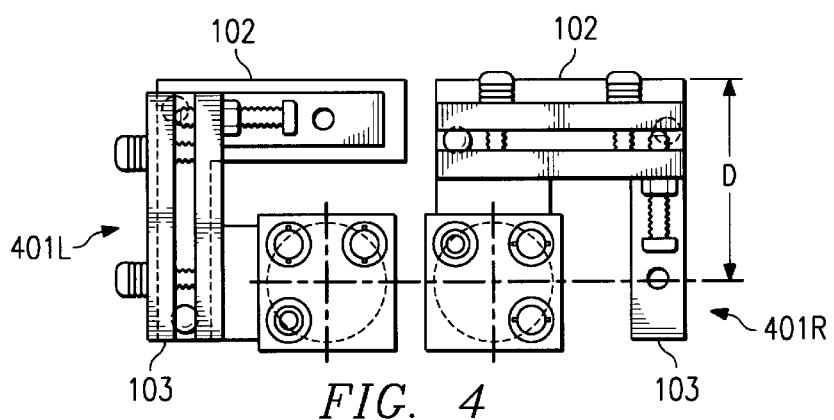
FIG. 4 is plan view of a multi-camera deployment using right-handed and left hand assemblies 401L and 401R.

Reversibility of base plate 101 as described immediately above enables two cameras to be nested adjacently within a combined "U"-shape as shown on FIG. 4. Assemblies 401L and 401R differ only in that the base plate 101 in one assembly is reversed, and that mounting leg supports vertical support portion 114 in one assembly while cantilevering leg 103 supports it in the other. Significant further advantage is gained in the multi-camera deployment illustrated in FIG. 4 when the dimensions, diameters, hole placements and thicknesses of the components of assemblies 401L and 401R are selected to keep a constant cantilevered distance D from the optical axis of camera assemblies 180 to a common vertical mounting surface.

The foregoing disclosure describes the inventive mount in use in conjunction with holding and aligning a CCD camera.

It will be appreciated, however, that the invention is not limited solely to CCD camera applications, and that the invention may be used with equivalent enabling effect for adjustment and alignment advantage in conjunction with other devices, such as optical or laser devices.

Although the present invention and its advantages have been described in detail, it should be understood that various changes, substitutions and alterations can be made herein without departing from the spirit and scope of the invention as defined by the appended claims.

We claim:

1. A mount for holding and aligning a camera having an optical axis disposed substantially vertically parallel to a z-axis, the z-axis orthogonal to an x-axis and a y-axis in a horizontal plane, the mount comprising:

an L-shaped base plate having a mounting leg extending along the x-axis and a cantilevering leg extending along the y-axis, the mounting leg disposed to be rigidly fixed to a vertical mounting surface so as to cause the cantilevering leg to cantilever out therefrom;

a camera mounting assembly extending along the z-axis, the camera mounting assembly having averse and reverse faces, the camera disposed to be rigidly fixed to the averse face of the camera mounting assembly;

a thrust plate including horizontal motion and vertical support portions, the horizontal motion portion providing an L-shaped horizontal planar surface opposing the base plate, the vertical support portion providing a vertical planar surface opposing the reverse face of the camera mounting assembly;

means for adjusting angular separation of the cantilevering leg from the horizontal planar surface;

means for adjusting angular separation of the mounting leg from the horizontal planar surface; and means for adjusting angular separation of the camera mounting assembly from the vertical planar surface.

2. The mount of claim 1, in which the camera mounting assembly includes a vertical motion plate fixed rigidly to a camera interface plate, the vertical motion plate providing the reverse face and the camera interface plate providing the averse face.

3. The mount of claim 2, in which the camera interface plate is selected from a group thereof, each member of the group customized to fix rigidly to a different camera mounting configuration.

4. The mount of claim 1, in which the base plate and the horizontal planar surface are held adjustably apart by spring-loaded screws.

5. The mount of claim 4, in which the means for adjusting angular separation of the cantilevering leg from the horizontal planar surface is a threaded screw.

6. The mount of claim 5, further comprising means for locking the threaded screw at a selected adjustment.

7. The mount of claim 6, in which the means for locking is a lock nut.

8. The mount of claim 4, in which the means for adjusting angular separation of the mounting leg from the horizontal planar surface is a threaded screw.

9. The mount of claim 8, further comprising means for locking the threaded screw at a selected adjustment.

10. The mount of claim 9, in which the means for locking is a lock nut.

11. The mount of claim 1, in which the vertical planar surface and the reverse face of the camera mounting assembly are held adjustably apart by spring-loaded screws.

12. The mount of claim 11, in which the means for adjusting angular separation of the camera mounting assembly from the vertical planar surface is a threaded screw.

13. The mount of claim 12, further comprising means for locking the threaded screw at a selected adjustment.

14. The mount of claim 13, in which the means for locking is a lock nut.

15. The mount of claim 1, further comprising:

means for controlling thermal behavior of the base plate, the thrust plate and the camera mounting assembly.

16. The mount of claim 15, in which the means for adjusting angular separation of the cantilevering leg from the horizontal planar surface is a first threaded screw, the means for adjusting angular separation of the mounting leg from the horizontal planar surface is a second threaded screw, and wherein the means for controlling comprises:

a ball bearing separating horizontal opposing faces of the base plate and the horizontal planar surface, the ball bearing held immobile within recesses provided in each of said horizontal opposing faces; and a ball tip on both the first and second threaded screws, each ball tip disposed to contact one of said horizontal opposing faces, wherein horizontal motion of one of said ball tips is unrestrained, and wherein horizontal motion of the other ball tip is restrained (1) to along the y-axis if said restrained ball tip is on the first threaded screw and (2) to along the x-axis if said restrained ball tip is on the second threaded screw.

17. The mount of claim 16, in which motion of said restrained ball tip is restrained via receiving said restrained ball tip in a slotted recess.

18. The mount of claim 15, in which the means for adjusting angular separation of the camera mounting assembly from the vertical planar surface is a threaded screw, and wherein the means for controlling comprises:

a first ball bearing separating vertical opposing faces of the camera mounting assembly and the vertical planar surface, the first ball bearing held immobile within recesses provided in each of said vertical opposing faces;

a ball tip on the threaded screw, the ball tip disposed to contact one of said vertical opposing faces wherein vertical motion of the ball tip is unrestrained; and a second ball bearing also separating said vertical opposing faces, wherein motion of the second ball bearing is restrained to along the z-axis.

19. The mount of claim 18, in which motion of the second ball bearing is restrained via receiving the second ball bearing in a slotted recess.

20. The mount of claim 1, in which the base plate is reversible, wherein a left-hand and a right-hand embodiment thereof results from reversing the mounting leg in the horizontal plane about the vertical mounting surface.

21. The mount of claim 20, in which a substantially constant separation distance is maintained between the optical axis of the camera and the vertical mounting surface regardless of whether the camera is mounted on a left-hand embodiment or on a right-hand embodiment of the base plate.

22. A method for holding and aligning a camera having an optical axis disposed substantially vertically parallel to a z-axis, the z-axis orthogonal to an x-axis and a y-axis in a horizontal plane, the method comprising the steps of:

(a) rigidly fixing an L-shaped base plate to a vertical mounting surface, the base plate providing a mounting leg extending along the x-axis and a cantilevering leg extending along the y-axis, wherein the mounting leg is fixed to the vertical mounting surface and the cantilevering leg cantilevers out therefrom;

(b) rigidly fixing the camera to a camera mounting assembly, the camera mounting assembly extending along the z-axis and having averse and reverse faces wherein the camera is fixed to the averse face thereof;

(c) disposing a thrust plate including horizontal motion and vertical support portions to confront the base plate and the reverse side of the camera mounting assembly respectively, the horizontal motion portion providing an L-shaped horizontal planar surface opposing the base plate, the vertical support portion providing a vertical planar surface opposing the reverse face of the camera mounting assembly;

(d) selectively panning the camera along the y-axis by adjusting angular separation of the cantilevering leg from the horizontal planar surface; and (e) selectively panning the camera along the x-axis by adjusting angular separation of the mounting leg from the horizontal planar surface;

wherein steps (d) and (e) are accomplished independently.

23. The method of claim 22, further comprising the step of:

(f) selectively rotating the camera about the z-axis by adjusting angular separation of the camera mounting assembly from the vertical planar surface;

wherein steps (d), (e) and (f) are accomplished independently.

24. The method of claim 22, in which the camera mounting assembly includes a vertical motion plate fixed rigidly to a camera interface plate, the vertical motion plate providing the reverse face and the camera interface plate providing the averse face.

25. The method of claim 24, in which the camera interface plate is selected from a group thereof, each member of the group customized to fix rigidly to a different camera mounting configuration.

26. The method of claim 22, in which the base plate and the horizontal planar surface are held adjustably apart by spring-loaded screws, and in which said adjustment of angular separation of the cantilevering leg from the horizontal planar surface in step (d) is accomplished by a threaded screw.

27. The method of claim 26, further comprising the step of:

(f) selectively locking the threaded screw at a chosen adjustment.

28. The method of claim 27, in which step (f) is accomplished via a lock nut.

29. The method of claim 22, in which the base plate and the horizontal planar surface are held adjustably apart by spring-loaded screws, and in which said adjustment of angular separation of the mounting leg from the horizontal planar surface in step (e) is accomplished by a threaded screw.

30. The method of claim 29, further comprising the step of:

(f) selectively locking the threaded screw at a chosen adjustment.

31. The method of claim 30, in which step (f) is accomplished via a lock nut.

32. The method of claim 23, in which the vertical planar surface and the reverse face of the camera mounting assembly are held adjustably apart by spring-loaded screws, and in which said adjustment of angular separation of the camera mounting assembly from the vertical planar surface in step (f) is accomplished by a threaded screw.

33. The method of claim 32, further comprising the step of:

(g) selectively locking the threaded screw at a chosen adjustment.

34. The method of claim 33, in which step (g) is accomplished via a lock nut.

35. The method of claim 22, further comprising the step of:

(f) controlling thermal behavior of the base plate and the thrust plate.

36. The method of claim 35, in which adjustment of angular separation of the cantilevering leg from the horizontal planar surface in step (d) is accomplished by a first threaded screw, adjustment of angular separation of the mounting leg from the horizontal planar surface in step (e) is accomplished by a second threaded screw, and wherein step (f) comprises the substeps of:

(i) separating horizontal opposing faces of the base plate and the horizontal planar surface with a ball bearing, the ball bearing held immobile within recesses provided in each of said horizontal opposing faces; and (ii) providing a ball tip on both the first and second threaded screws, each ball tip disposed to contact one of said horizontal opposing faces, wherein horizontal motion of one of said ball tips is unrestrained, and wherein horizontal motion of the other ball tip is restrained (1) to along the y-axis if said restrained ball tip is on the first threaded screw and (2) to along the x-axis if said restrained ball tip is on the second threaded screw.

37. The method of claim 36, in which motion of said restrained ball tip is restrained in substep (ii) via receiving said restrained ball tip in a slotted recess.

38. The method of claim 23, further comprising the step of:

(g) controlling thermal behavior of the thrust plate and the camera mounting assembly.

39. The method of claim 38, in which adjustment of angular separation of the camera mounting assembly from the vertical planar surface in step (f) is accomplished by a threaded screw, and wherein step (g) comprises the substeps of:

(i) separating vertical opposing faces of the camera mounting assembly and the vertical planar surface with a first ball bearing, the first ball bearing held immobile within recesses provided in each of said vertical opposing faces;

(ii) providing a ball tip on the threaded screw, the ball tip disposed to contact one of said vertical opposing faces wherein vertical motion of the ball tip at said contact is unrestrained; and (iii) also separating said vertical opposing faces with a second ball bearing, wherein motion of the second ball bearing is restrained to along the z-axis.

40. The method of claim 39, in which motion of the second ball bearing is restrained in substep (iii) via receiving the second ball bearing in a slotted recess.

41. The method of claim 22, in which the base plate is reversible, wherein a left-hand and a right-hand embodiment thereof results from reversing the mounting leg in the horizontal plane about the vertical mounting surface.

42. The method of claim 41, further comprising the step of:

(f) maintaining a substantially constant separation distance between the optical axis of the camera and the vertical mounting surface regardless of whether the camera is mounted on a left-hand embodiment or on a right-hand embodiment of the base plate.

43. A mount for holding and aligning a camera having an optical axis disposed substantially vertically parallel to a z-axis, the z-axis orthogonal to an x-axis and a y-axis in a horizontal plane, the mount comprising:

an L-shaped base plate having a mounting leg extending along the x-axis and a cantilevering leg extending along the y-axis, the mounting leg disposed to be rigidly fixed to a vertical mounting surface so as to cause the cantilevering leg to cantilever out therefrom;

a camera mounting assembly extending along the z-axis, the camera mounting assembly having averse and reverse faces, the camera mounting assembly further including a vertical motion plate fixed rigidly to a camera interface plate, the vertical motion plate providing the reverse face and the camera interface plate providing the averse face, the camera disposed to be rigidly fixed to camera the averse face of the camera interface plate, the camera interface plate selected from a group thereof, each member of the group customized to fix rigidly to a different camera mounting configuration;

a thrust plate including horizontal motion and vertical support portions, the horizontal motion portion providing an L-shaped horizontal planar surface opposing the base plate and held adjustably apart by spring-loaded screws, the vertical support portion providing a vertical planar surface opposing the reverse face of the vertical motion plate and also held adjustably apart by spring-loaded screws;

a first threaded screw for adjusting angular separation of the cantilevering leg from the horizontal planar surface;

a second threaded screw for adjusting angular separation of the mounting leg from the horizontal planar surface;

a third threaded screw for adjusting angular separation of the camera mounting assembly from the vertical planar surface;

lock nuts on each of the first, second and third threaded screws for selectively locking the corresponding threaded screw at a chosen adjustment;

means for controlling horizontal thermal behavior of the base plate and the thrust plate, said means for controlling horizontal thermal behavior including:

a first ball bearing separating horizontal opposing faces of the base plate and the horizontal planar surface, the first ball bearing held immobile within recesses provided in each of said horizontal opposing faces; and first and second ball tips on each of the first and second threaded screws, each of the first and second ball tip disposed to contact one of said horizontal opposing faces, wherein horizontal motion of one of said first and second ball tips is unrestrained, and wherein, via receiving the other of said first and second ball tips in a slotted recess, horizontal motion thereof is restrained (1) to along the y-axis if said restrained ball tip is on the first threaded screw and (2) to along the x-axis if said restrained ball tip is on the second threaded screw;

means for controlling vertical thermal behavior of the thrust plate and the camera mounting assembly, said means for controlling vertical thermal behavior including:

a second ball bearing separating vertical opposing faces of the vertical motion plate and the vertical planar surface, the second ball bearing held immobile within recesses provided in each of said vertical opposing faces;

a third ball tip on the third threaded screw, the third ball tip disposed to contact one of said vertical opposing faces wherein vertical motion thereof is unrestrained; and a third ball bearing also separating said vertical opposing faces, wherein motion of the third ball bearing is restrained to along the z-axis via receiving the second ball bearing in a slotted recess; and the base plate being reversible, wherein a left-hand and a right-hand embodiment thereof results from reversing the mounting leg in the horizontal plane about the vertical mounting surface, and wherein further a substantially constant separation distance is maintained between the optical axis of the camera and the vertical mounting surface regardless of whether the camera is mounted on a left-hand embodiment or on a right-hand embodiment of the base plate.

* * * * *